United States Patent
Petzl et al.

(10) Patent No.: US 8,402,616 B2
(45) Date of Patent: Mar. 26, 2013

(54) CARABINER WITH MOVING GATE IN THE FORM OF A WIRE

(75) Inventors: Paul Petzl, Barraux (FR); Pierre Plaze, Chambery (FR); Alain Maurice, Saint Hilaire du Touvet (FR)

(73) Assignee: Zedel, Crolles (FR)

( * ) Notice: Subject to any disclaimer, the term of this patent is extended or adjusted under 35 U.S.C. 154(b) by 716 days.

(21) Appl. No.: 12/451,190

(22) PCT Filed: Apr. 22, 2008

(86) PCT No.: PCT/FR2008/000565
§ 371 (c)(1),
(2), (4) Date: Nov. 2, 2009

(87) PCT Pub. No.: WO2008/148950
PCT Pub. Date: Dec. 11, 2008

(65) Prior Publication Data
US 2010/0125984 A1    May 27, 2010

(30) Foreign Application Priority Data
May 3, 2007  (FR) ...................................... 07 03188

(51) Int. Cl.
*F16B 45/02* (2006.01)
(52) U.S. Cl. ...................... 24/599.6; 24/599.7; 24/600.9
(58) Field of Classification Search ................. 24/601.5, 24/601.7, 601.8, 601.2, 601.3, 600.9, 599.1, 24/599.4, 599.6, 599.7; 294/82.17, 82.19
See application file for complete search history.

(56) References Cited

U.S. PATENT DOCUMENTS

| 403,038 | A |   | 5/1889  | Codde |
|---------|---|---|---------|-------|
| 476,534 | A | * | 6/1892  | Giese ............................ 24/601.5 |
| 1,849,816 | A | * | 3/1932 | Yingling ....................... 24/600.1 |
| 2,126,379 | A | * | 8/1938 | Fischer ......................... 24/601.5 |
| 2,349,021 | A | * | 5/1944 | Truesdale et al. ............. 24/599.1 |
| 3,099,055 | A |   | 7/1963  | Huber |
| 3,501,817 | A | * | 3/1970  | Bambenek et al. .......... 24/600.9 |
| 5,357,657 | A |   | 10/1994 | Petzl |
| 2005/0172461 | A1 | * | 8/2005 | Hall ............................. 24/599.9 |
| 2006/0174458 | A1 | * | 8/2006 | Carnall et al. ................ 24/600.2 |

FOREIGN PATENT DOCUMENTS

| DE | 195 39 587 A1 | 4/1997 |
| EP | 0 606 808 A1  | 7/1994 |
| GB | 304966        | 1/1929 |
| GB | 2 192 926 A   | 1/1988 |

OTHER PUBLICATIONS

International Search Report for International Application No. PCT/FR2008/000565, filed Apr. 22, 2008.

* cited by examiner

*Primary Examiner* — Robert J Sandy
(74) *Attorney, Agent, or Firm* — Oliff & Berridge, PLC (57) ABSTRACT

A carabiner equipped with a swivelling gate formed by a rigid metal wire of smaller diameter than that of the body. The wire is provided with a protuberance at one of the ends to form a male latching element and an articulation loop at the opposite end for passage of the swivel-pin. A flexible return device for returning the gate to the closed position comprises a compression spring operating in conjunction with an intermediate transfer stirrup inside a housing of the body.

10 Claims, 8 Drawing Sheets

CARABINER WITH MOVING GATE IN THE FORM OF A WIRE

BACKGROUND OF THE INVENTION

The invention relates to a carabiner comprising:
a metal body in the form of an open ring having a first end equipped with a securing part,
a gate moving around a swivel-pin between a closed position and an inwardly open position, said swivel-pin being situated in proximity to the second end of the body,
and a flexible return device biasing the gate to the closed position.

STATE OF THE ART

The document EP 0606808 describes a carabiner wherein the gate pivoting towards the inside of the body is formed by an aluminium alloy bar having substantially the same diameter as the body. The gate is returned to the closed position by the action of a spring acting directly on the end of the gate. The spring can be a torsion spring or a leaf spring. The presence of a bar of similar diameter to the body of the carabiner does however limit the opening zone, as the end of the gate quickly comes up against a stop.

Carabiners also exist wherein the bar of the moving gate mobile is replaced by a steel wire shaped as a pin. The wire is elastically deformable and folded into an open loop. The ends are curved into the form of a bracket without being coaxial and are inserted in offset holes of the fixed body. The pin swivels on the body around its curved ends and is deformed when the swivelling opening movement takes place. The gate is then automatically returned by flexible biasing to the closed position. This type of carabiner presents a larger opening zone but has the drawback of presenting a hook at the end of the C-shaped body.

OBJECT OF THE INVENTION

The object of the invention consists in providing a carabiner having a steel wire gate that is easy to handle under all conditions, that is inexpensive to manufacture, and has a flexural strength meeting the requirements of safety standards.

The carabiner according to the invention is characterized in that the gate is formed by a rigid metal wire having a smaller inside diameter than that of the body, said wire comprising a protuberance at one of the ends thereof to constitute the male latching element, and an articulation loop at the opposite end for passage of the swivel-pin.

The articulation loop rotates around the fixed swivel-pin when closing or opening of the gate are performed, and the protuberance at the opposite end is blocked by the female securing element of the body in the closed position. The wire is single-strand and easy to handle when opening.

According to a preferred embodiment, the articulation loop comprises a closed contour achieved by winding the end of the metal wire. The flexible return device of the gate comprises a compression spring operating in conjunction with an intermediate transfer stirrup inside a housing of the second end of the body. The articulation loop of the gate comprises two guiding flats on the opposite surfaces and a bulge in a non-flattened zone acting as blocking part operating in conjunction with a stop zone of the body. The female securing element at the top end of the body comprises a recess having a profile of conjugate shape to the male latching element.

Combination of the upline securing system of the gate with the downline blocking system enables the tensile strength of the carabiner to be improved.

The transfer stirrup comprises a centering pin designed to be inserted in the compression spring and two transmission branches in contact with the articulation loop to transmit a loading movement to the spring when the gate is opened and an opposite closing movement of the gate by rotation of the loop on the fixed swivel-pin when expansion of the spring takes place.

BRIEF DESCRIPTION OF THE DRAWINGS

Other advantages and features of the invention will become more clearly apparent from the following description of an embodiment of the invention given for non-restrictive example purposes only and represented in the accompanying drawings in which.

DETAILED DESCRIPTION OF THE INVENTION

With reference to FIGS. 1 to 4 and 11, a carabiner 10 for mountain climbing comprises a C-shaped metal body 11 and a moving gate 12 mounted with limited swivelling around a swivel-pin 13 situated at the bottom end of body 11. The top first end E1 of body 11 is provided with a female securing element 14 in which a male latching element 15 of gate 12 engages when returning to the closed position due to the action of a flexible return device 16. Body 11 is preferably made of forged aluminium alloy.

Figures 12, 13:
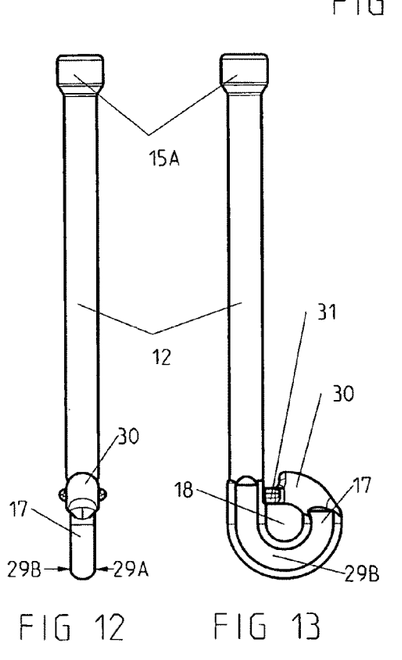
FIGS. 12 and 13 are front and side views of the moving gate.

In FIGS. 12 and 13, gate 12 is formed by a steel wire or rod having a much smaller diameter than that of body 11. The rigid wire of gate 12 is terminated at the top end by a protuberance 15A in the form of a cap to form male latching element 15. The bottom end of the steel wire is wound into an articulation loop having a closed contour delineating a circular inner hole 18 through which the fixed and clamped swivel-pin 13 passes.

Figure 11:
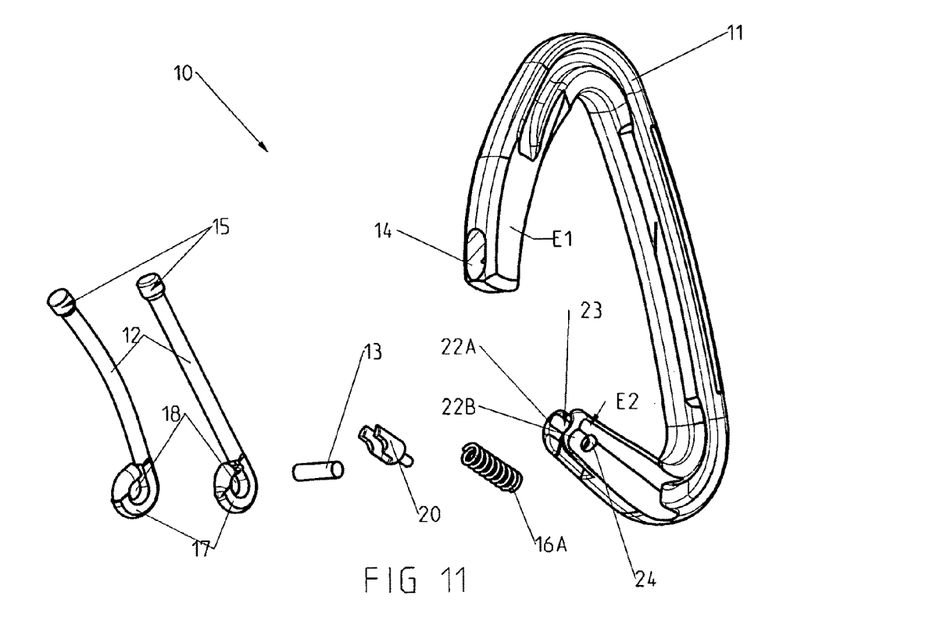
FIG. 11 is an exploded perspective view of the carabiner according to the invention.

The wire of gate 12 can be straight or curved (see respectively right-hand wire and left-hand wire in FIG. 11).

Female securing element 14 at top end E1 of body 11 comprises a recess 14A (see FIG. 4) the internal profile whereof has a conjugate shape to that of male latching element 15. In the closed position of gate 12, the wire comes up against a stop 19 arranged inside recess 14A, and protuberance 15A of male latching element 15 remains captive in recess 14A without being salient from body 11. The cross-section of top first end E1 remains substantially constant with respect to the rest of body 11 without forming a bulge.

Figure 1:
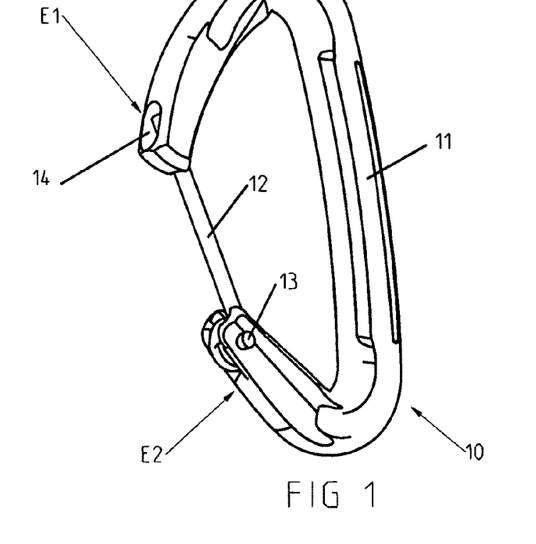
FIGS. 1 and 2 are perspective side views with different orientations of the carabiner according to the invention represented in the closed position of the moving gate.
Figure 2:
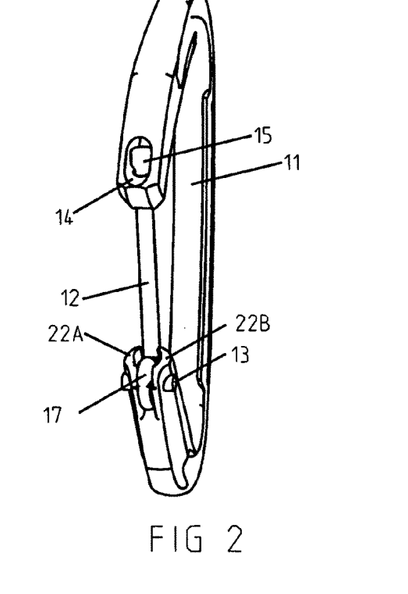
Figure 3:
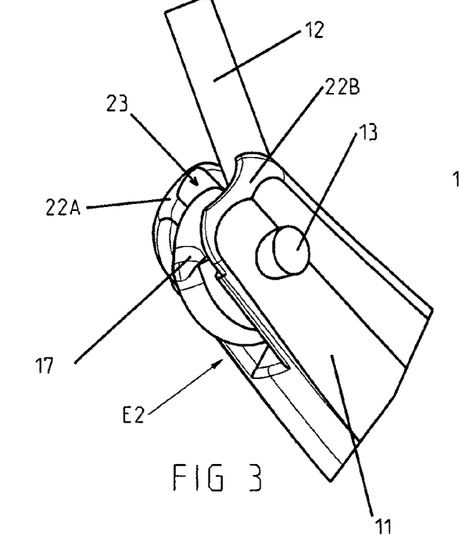
FIG. 3 shows a detailed view of FIG. 1 illustrating assembly of the articulation loop of the wire in the bottom second end of the body.
Figure 4:
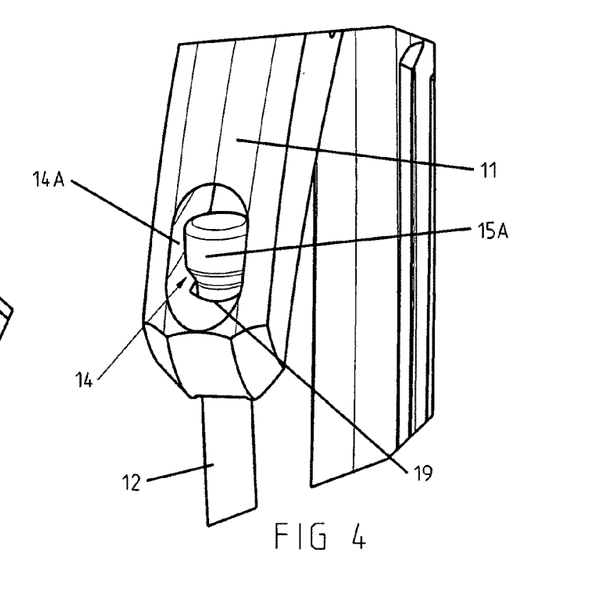
FIG. 4 shows a detailed view of FIG. 2 illustrating blocking of the terminal protuberance of the wire in the female securing element of the body.
Figure 5:
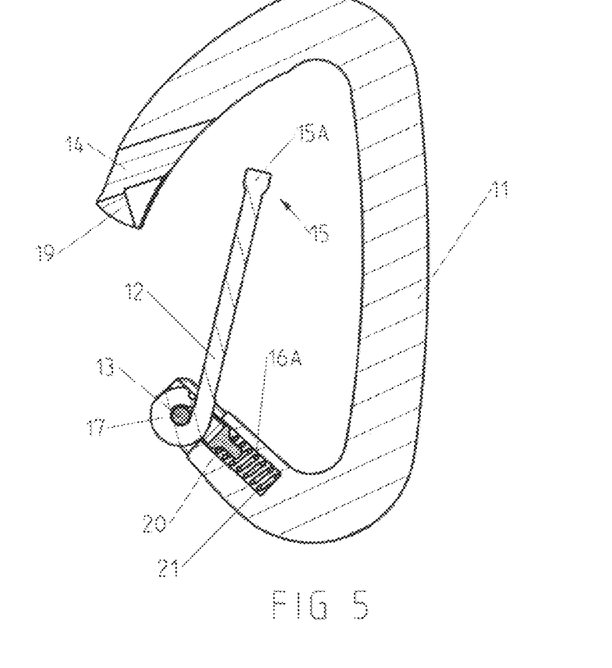
FIG. 5 represents a cross-sectional view of the carabiner along the line 5-5 of FIG. 6, the gate being in the course of opening.
Figure 6:
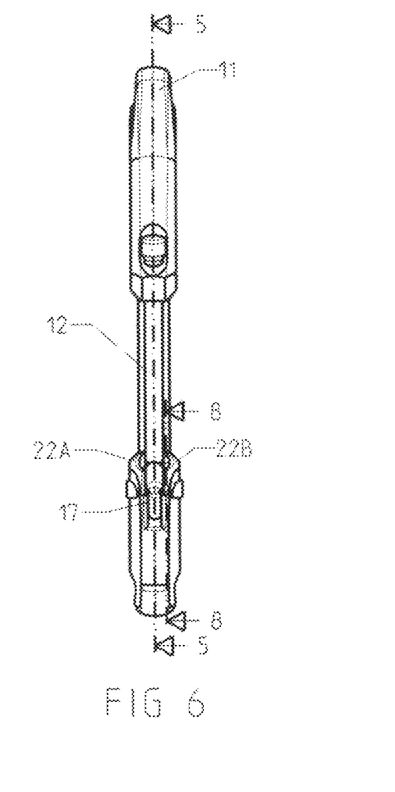
FIG. 6 is a front view of the carabiner.
Figure 7:
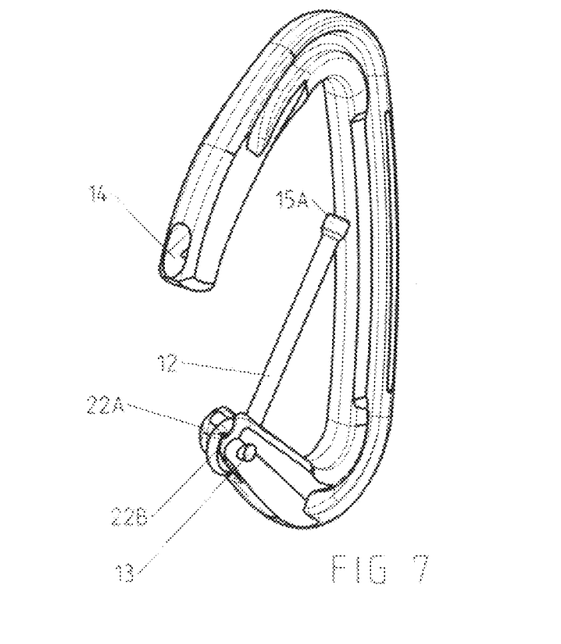
FIG. 7 is a perspective side view of the carabiner with the gate at the end of opening travel.
Figure 8:
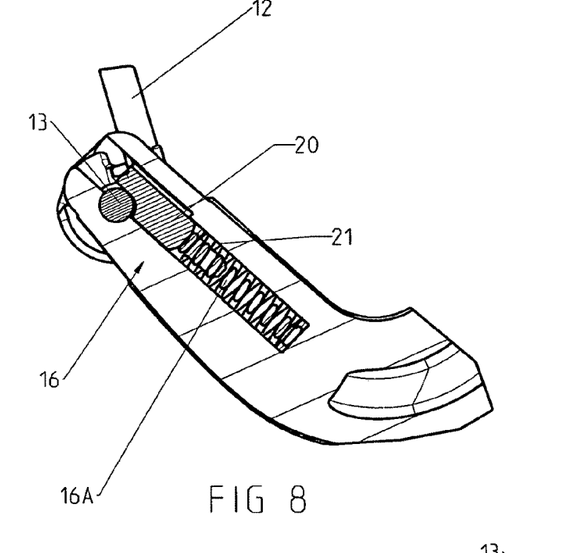
FIGS. 8 to 10 are detailed cross-sectional views of the flexible return device respectively in the closed, partially open, and end of opening travel positions of the gate.
Figure 9:
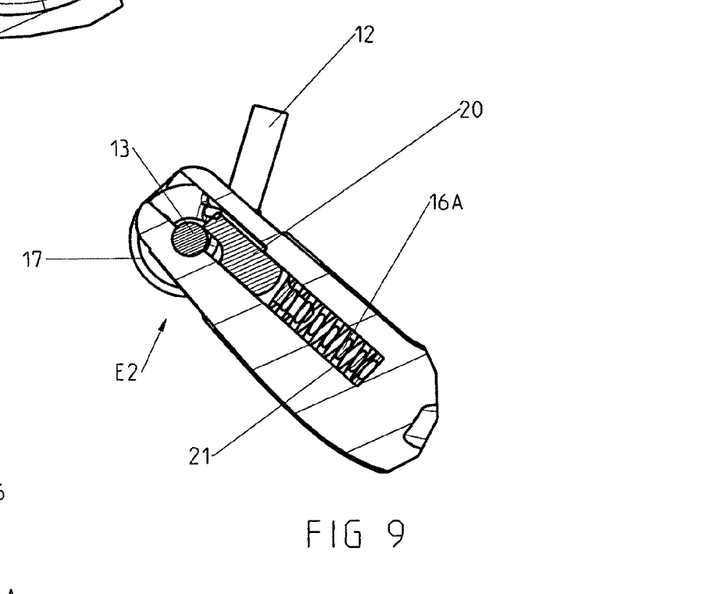
Figure 10:
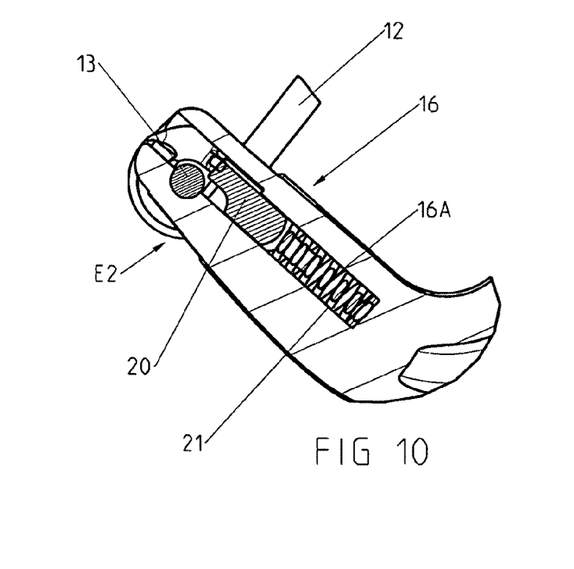

In FIGS. 8 to 10, flexible return device 16 of gate 12 comprises a compression spring 16A operating in conjunction with an intermediate transfer stirrup 20. The assembly is arranged in a housing 21 arranged in bottom second end E2 of body 11, transfer stirrup 20 being inserted between articulation loop 17 and spring 16A to transmit the closing force to gate 12.

Bottom second end E2 of body 11 is provided with two slightly convex opposite wings 22A, 22B (FIGS. 2, 3 and 11) separated from one another by a central gap 23 accommodating articulation loop 17 of gate 12. The two wings 22A, 22B are provided with two holes 24 aligned in the transverse direction with hole 18 of loop 17 for passage of swivel-pin 13. Housing 21 opens out into gap 23 to enable bidirectional sliding of transfer stirrup 20 when compression and expansion of spring 16A take place.

Figure 14:
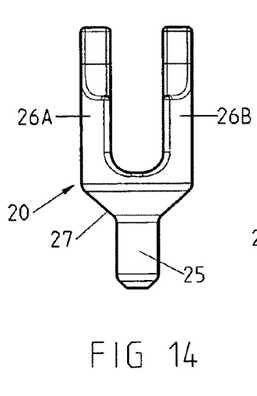
FIGS. 14 and 15 are front and side views of the transfer stirrup.
Figure 15:
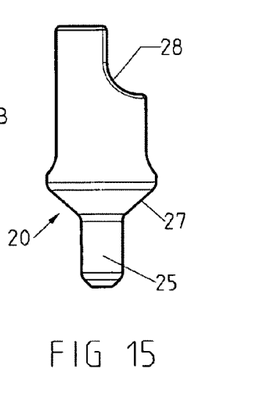
Figure 16:
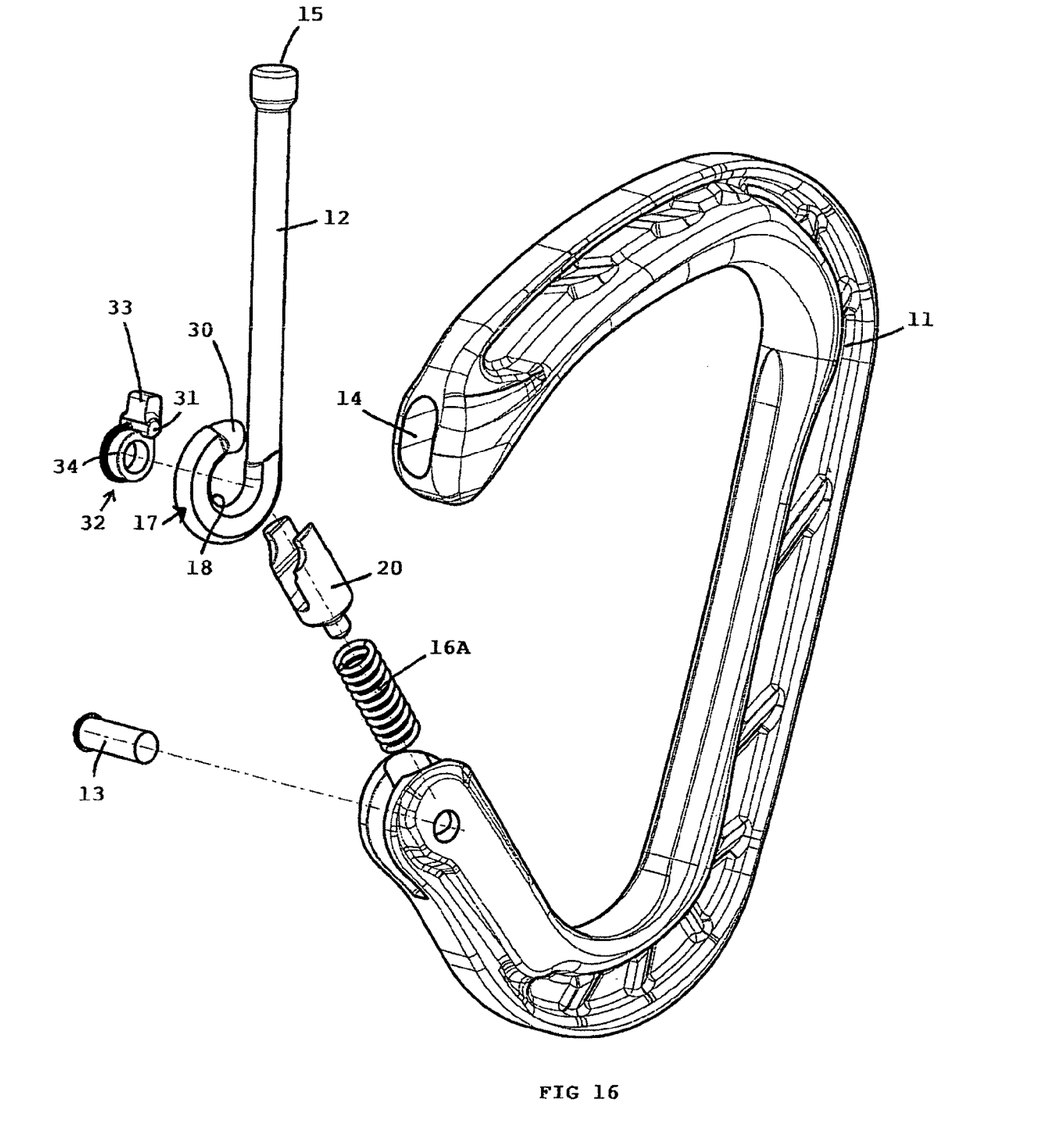
FIG. 16 is a variant of FIG. 11.
Figure 17:
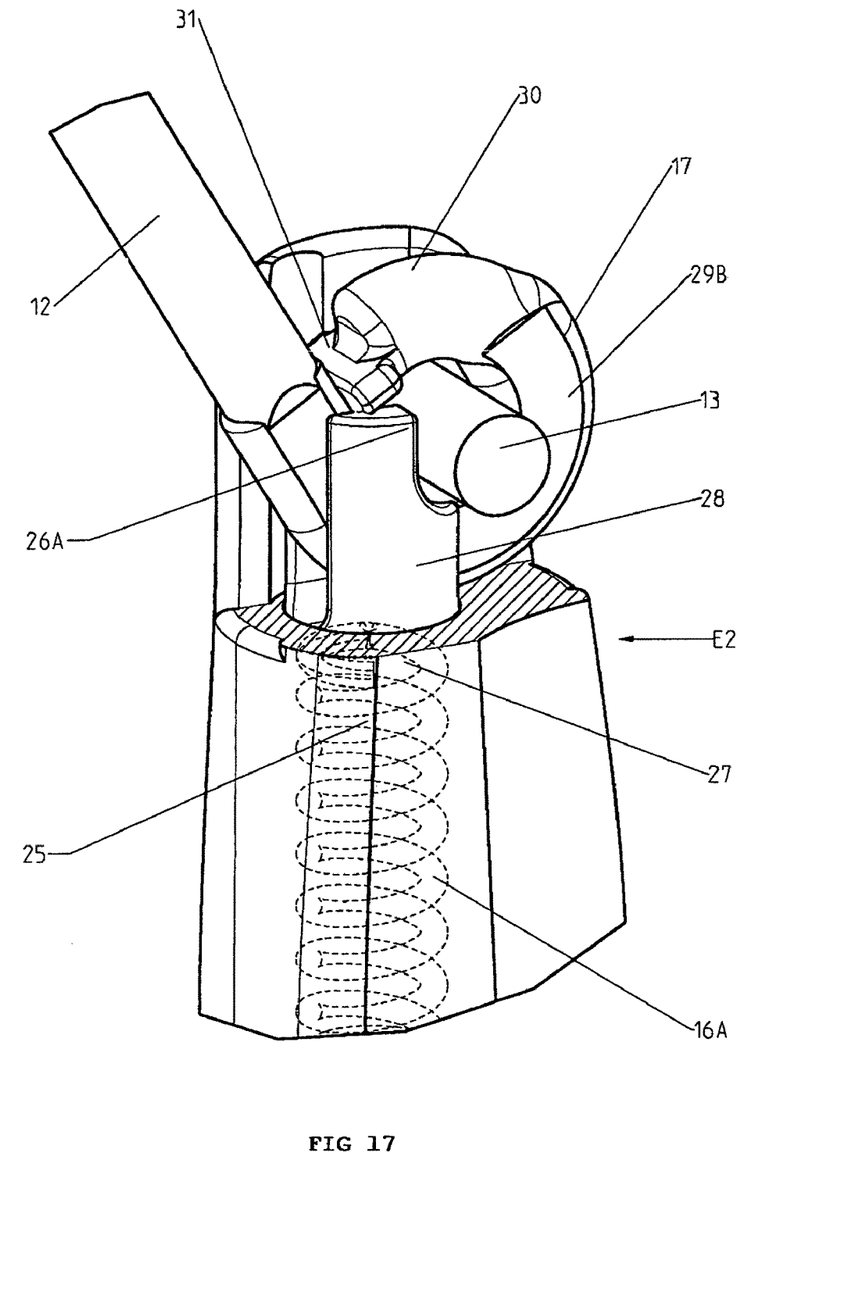
FIG. 17 represents a partially cutaway perspective view of assembly of the swivel-pin in the articulation loop of the carabiner according to FIG. 16.
Figure 18:
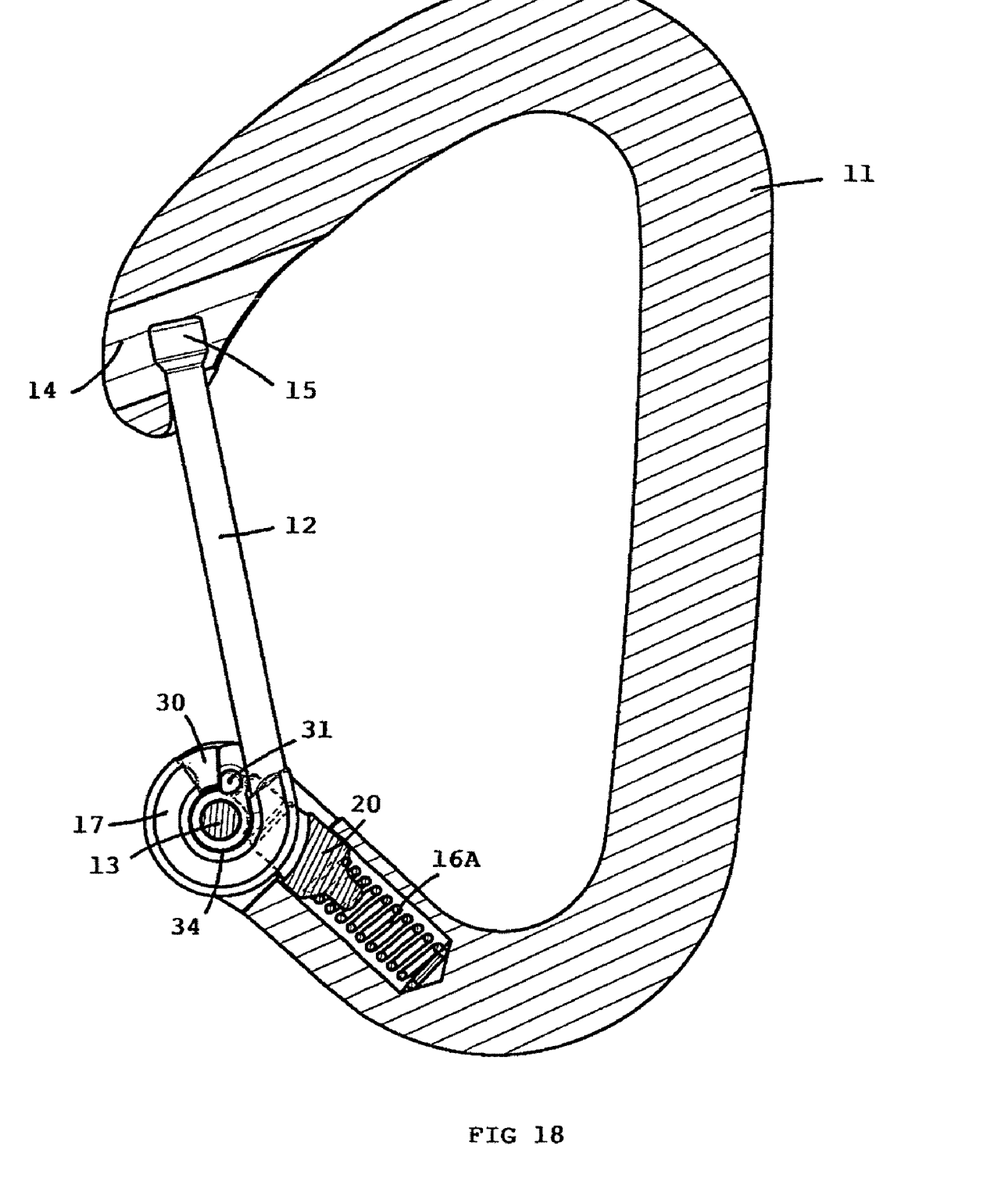
FIGS. 18 and 19 illustrate cross-sectional views of the carabiner of FIG. 16 respectively in the closed and open positions of the swivelling gate.
Figure 19:
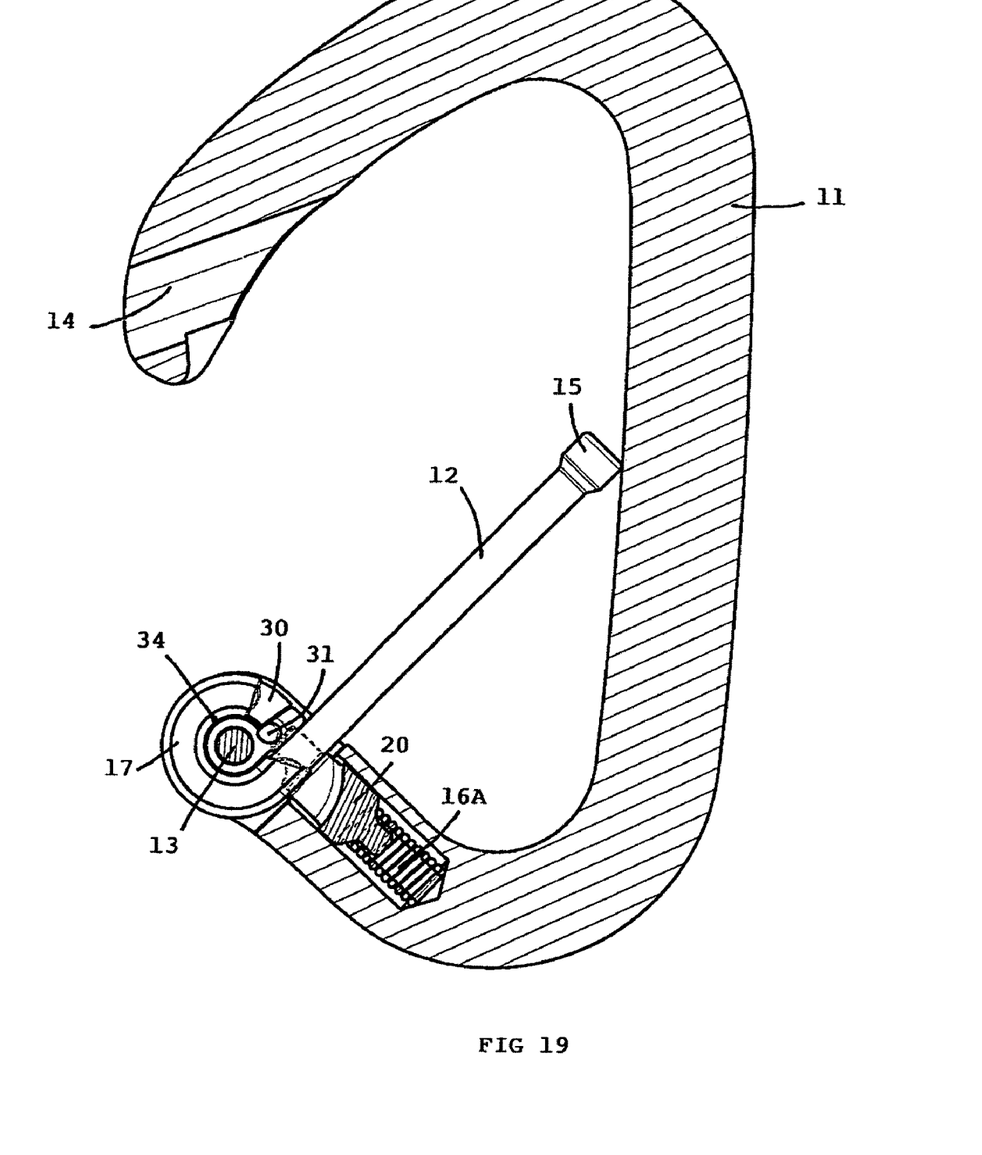

In FIGS. 14 and 15, transfer stirrup 20 comprises a frustum-shaped central part 27 equipped with a centering pin 25 designed to be inserted in compression spring 16A, and with two parallel transmission branches 26A, 26B in the form of a U-shape fork. Each branch 26A, 26B is provided with a cut-out portion 28 of rounded shape pressing on swivel-pin 13.

With reference to FIGS. 12 and 13, articulation loop 17 of gate 12 comprises two guiding flats 29A, 29B on the opposite surfaces and a non-flattened zone or bulge 30 acting as blocking part operating in conjunction with a stop zone of body 11 to prevent any unwinding effect of the wound wire of loop 17. The non-cut end of transmission branches 26A, 26B of transfer stirrup 20 presses on a pair of spigots 31 at the end of loop 17 so as to transmit a loading movement to spring 16A when opening of gate 12 takes place, and to derive, from relaxation of spring 16A, an opposite closing movement of gate 12 by rotation of loop 17 on fixed swivel-pin 13.

The steel wire of gate 12 and its protuberance 15A in the form of a head resembles: a nail the head of which has been replaced by articulation loop 17. Securing elements 14 and latching elements 15, and also flexible return device 16, are integrated in body 11 of carabiner 10 without requiring the cross-section of the latter to be increased.

Assembly of carabiner 10 according to the invention is performed in the following manner:

Spring 16A in first inserted in housing 21 of bottom second end E2 of body 11, and transfer stirrup 20 is then inserted by engaging pin 25 in helical spring 16A. Articulation loop 17 of gate 12 is then positioned in gap 23 between the two transmission branches 26A, 26B of transfer stirrup 20 so as to align hole 18 of loop 17 with the two holes 24 of wings 22A, 22B. Swivel-pin 13 can then be inserted in hole 18 and be secured by head riveting.

Swivel-pin 13 is fixed and articulation loop 17 rotates around swivel-pin 13 when closing or opening of carabiner 10 are performed. The presence of guiding flats 29A, 29B enables a good articulation to be had when rotation of gate 12 takes place. Bulge 30 of non-flattened zone operates in conjunction with a stop zone of body 11 to prevent any unwinding effect of the wound wire of loop 17. Combination of the upline securing system of the gate with the downline blocking system enables the tensile strength of the carabiner 10 to be improved.

The metal wire of moving gate 12 is preferably made from stainless steel or treated steel, but any other metal can be used.

In the alternative embodiment according to FIGS. 16 to 19, loop 17 of gate 12 stops at the level of bulge 30. The pair of spigots 31 are no longer securely affixed to the end of articulation loop 17 but are supported by a support part 32 having a first end 33 pressing against bulge 30 and comprising a tubular base-part 34 at the opposite second end. Base-part 34 is housed coaxially in circular hole 18 of loop 17 and advantageously acts as bearing for swivel-pin 13 passing through the latter.

The invention claimed is:

1. A carabiner comprising:
   a metal body in the form of an open ring having a first end equipped with a securing part,
   a gate moving around a swivel-pin between a closed position and an open position, said swivel-pin being situated in proximity to a bottom second end of the body,
   a flexible return device biasing the gate to the closed position, wherein the gate is formed by a rigid metal wire having a smaller diameter than that of the body, said wire comprising a protuberance at one of the ends thereof to constitute a male latching element, and an articulation loop at an opposite one of the ends thereof for passage of the swivel-pin.

2. The carabiner according to claim 1, wherein the articulation loop comprises a closed contour achieved by winding the end of the metal wire.

3. The carabiner according to claim 2, wherein the articulation loop of the gate comprises two guiding flats on the opposite surfaces and a bulge in a non-flattened zone acting as a blocking part operating in conjunction with a stop zone of the body.

4. The carabiner according to claim 2, wherein the body is made of forged aluminium alloy and, at the top end thereof, comprises a female securing element provided with a recess having a profile of conjugate shape to the male latching element, and wherein the wire of the moving gate is made from steel presenting a straight or curved shape.

5. The carabiner according to claim 1, wherein the flexible return device of the gate comprises a compression spring operating in conjunction with an intermediate transfer stirrup in a housing of the second end of the body.

6. The carabiner according to claim 5, wherein the transfer stirrup comprises a centering pin designed to be inserted in the compression spring, and two transmission branches in contact with the loop to transmit a loading movement to the spring when the gate is opened, and to transmit an opposite closing movement of the gate by rotation of the loop on the fixed swivel-pin when expansion of the spring takes place.

7. The carabiner according to claim 6, wherein the transmission branches of the transfer stirrup operate in conjunction with a pair of spigots to transmit said loading and closing movements.

8. The carabiner according to claim 7, wherein the pair of spigots are securedly affixed to the gate and are arranged in a continuation of a bulge of the loop.

9. The carabiner according to claim 1, wherein the bottom second end of the body is provided with two slightly convex opposite wings separated from one another by a central gap accommodating the articulation loop of the gate, the two wings being provided with two holes aligned in the transverse direction with a hole of the loop for passage of the swivel-pin.

10. The carabiner according to claim 7, wherein the pair of spigots are supported by a support part having a first end pressing against a bulge of the loop and comprising a tubular base-part at the opposite second end, said base-part being housed coaxially in the circular hole of the loop to act as a bearing for the swivel-pin.

* * * * *